US006281996B1

(12) United States Patent
Krimmel

(10) Patent No.: US 6,281,996 B1
(45) Date of Patent: Aug. 28, 2001

(54) OPTICAL NETWORK TERMINATION UNIT OF A HYBRID FIBER/COAX ACCESS NETWORK

(75) Inventor: Heinz Krimmel, Korntal-Münchingen (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/652,712

(22) Filed: Aug. 31, 2000

Related U.S. Application Data

(63) Continuation of application No. 08/961,442, filed on Oct. 30, 1997, now Pat. No. 6,134,035.

(51) Int. Cl.$^7$ .................................................. H04J 14/02
(52) U.S. Cl. ................... 359/125; 359/113; 359/114; 359/152; 359/153; 359/118; 359/137
(58) Field of Search ..................................... 359/113, 114, 359/152, 153, 118, 137, 125

(56) References Cited

U.S. PATENT DOCUMENTS

| | | |
|---|---|---|
| 3,701,146 | 10/1972 | Haga et al. . |
| 3,940,759 | 2/1976 | Zitelli et al. . |
| 3,960,010 | 6/1976 | Gustafsson . |
| 4,222,077 | 9/1980 | Yamada . |
| 4,222,110 | 9/1980 | Judell . |
| 4,291,387 | 9/1981 | Buchanan et al. . |
| 4,312,073 | 1/1982 | De Niet et al. . |
| 4,358,752 | 11/1982 | Tamada et al. . |
| 4,438,452 | 3/1984 | Powers . |
| 4,455,611 | 6/1984 | Powers . |
| 4,550,335 | 10/1985 | Powers . |
| 4,588,986 | * 5/1986 | Byrne .................................... 340/347 |
| 4,994,909 | * 2/1991 | Graves et al. .......................... 358/86 |
| 5,058,102 | 10/1991 | Heidemann et al. . |
| 5,517,232 | * 5/1996 | Heidemann et al. .................... 348/7 |
| 5,793,506 | * 8/1998 | Schmid .................................. 359/125 |
| 5,815,105 | 9/1998 | Ohie . |
| 5,859,895 | * 1/1999 | Pomp et al. ............................... 379/29 |
| 6,134,035 | * 10/2000 | Krimmel ................................ 359/125 |

FOREIGN PATENT DOCUMENTS

| | | |
|---|---|---|
| 3129752 | 2/1983 | (DE) . |
| 4436818 | 10/1995 | (DE) . |
| 4434918 | 4/1996 | (DE) . |
| 19508394 | 9/1996 | (DE) . |
| 0024618 | 8/1980 | (EP) . |

OTHER PUBLICATIONS

Gottlicher, Gerhard, Selb, Michael, Bender, Rolf. Digitale Übertragung von Analogsignalen über LWL–Strecken. In: Electronik 1, 8.1, 1988, pp 64–68.

* cited by examiner

*Primary Examiner*—Leslie Pascal
*Assistant Examiner*—Hanh Phan
(74) *Attorney, Agent, or Firm*—Ware, Fressola, Van Der Sluys & Adolphson LLP

(57) ABSTRACT

In a hybrid fiber/coax access network (NET) with a forward channel and a return channel, the return channel serves to transmit voice and video signals as well as data signals from groups of terminals (NT1; NT2) to a subcenter (HUB). Access by a group of terminals (NT1; NT2) to a shared electric line (KOAX1; KOAX2) is obtained by TDMA, FDMA, or CDMA, for example. An optical network termination unit (ONU) is connected to one or more electric lines (KOAX1; KOAX2). For each line or for each separate frequency range of the return channel, the optical network termination unit (ONU) contains an analog-to-digital converter (A/D1, A/D2) which digitizes the received signal. If two or more analog-to-digital converters (A/D1, A/D2) are provided, the individual digitized signals are multiplexed in a multiplexer (MUX) and then fed to a digital electrical-to-optical transducer (E/O2). The electrical-to-optical transducer (E/O2) converts the multiplexed signals to optical signals, which are then transmitted over an optical cable (FIBRE) to the subcenter (HUB), where they are processed digitally.

19 Claims, 1 Drawing Sheet

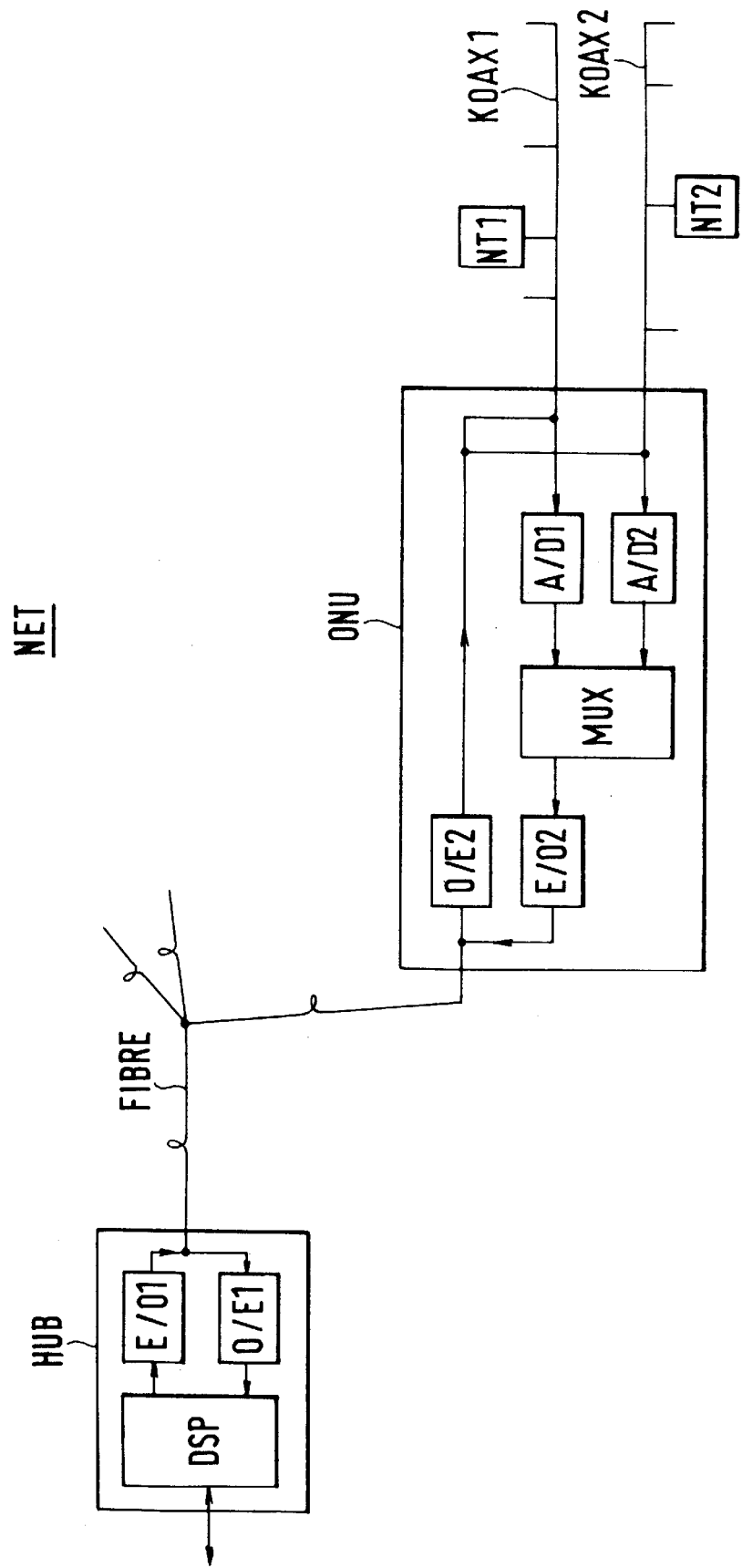

OPTICAL NETWORK TERMINATION UNIT OF A HYBRID FIBER/COAX ACCESS NETWORK

This application is a continuation of application Ser. No. 08/961,442 filed on Oct. 30, 1997 now U.S. Pat. No. 6,134,035.

TECHNICAL FIELD

This invention relates to an optical termination unit of a hybrid fiber/coax access network with a forward channel and a return channel. It is also directed and to a method of transmitting electric signals from two or more terminals of a hybrid fiber/coax access network over an electric line and an optical line.

BACKGROUND OF THE INVENTION

A hybrid fiber/coax access network is, for example, a cable television distribution network with a forward channel and a return channel, over which different bidirectional services, such as telephony, Internet communication, or video telephony, can be provided. DE 44 36 818 C1 discloses a subscriber access network for transmitting digital signals of bidirectional interactive telecommunications services. Behind the coaxial cable repeater of a CATV coaxial cable tree network which is closest to a respective subscriber, the optical fibers of a fiber-optic network are bidirectionally connected to the branches of the tree network. Transmission on the optical fibers is digital, for example in the ATM format. This requires a demodulation and/or a frequency conversion of the electric subscriber signals.

SUMMARY OF THE INVENTION

It is therefore an object of the invention to transmit electric signals of a plurality of terminals of a hybrid fiber/coax access network over significant distances, e.g., 50 km, with a smaller amount of technical complexity.

This object is attained by an optical network termination unit of a hybrid fiber/coax access network with a forward channel and a return channel which serves to receive and electrically transmit optical signals in the forward channel and to receive quasi-analog electric signals and optically retransmit said quasi-alalog electric signals in digital form in the return channel, which for this purpose comprises an optical-to-electrical transducer, a digital electrical-to-optical transducer, and an analog-to-digital converter, wherein the received electric signals are digitized in the analog-to-digital converter, and wherein the digitized signals are converted to digital optical signals in the digital electrical-to-optical transducer.

The object is also attained by a method of transmitting electric signals from two or more terminals of a hybrid fiber/coax access network over an electric line and an optical line, comprising the steps of transmitting the electric signals of the two or more terminals together over the electric line to an optical network termination unit; and digitizing the signals received in the optical termination unit and then converting the digitized signals to optical signals by means of a digital electrical-to-optical transducer.

A particular advantage of the invention is that a smaller amount of circuitry is required in the optical network termination units to convert the electric signals to optical signals.

Another advantage of the invention is the flexibility of the application of the optical network termination units as a result of the conversion of the electric signals without previous demodulation and the resulting applicability to arbitrarily modulated signals.

BRIEF DESCRIPTION OF THE DRAWINGS

The invention will become more apparent from the following description of an embodiment when taken in conjunction with the accompanying drawing.

The single FIGURE of the drawing is a schematic representation of a novel hybrid fiber/coax access network with a forward channel and a return channel.

BEST MODE FOR CARRYING OUT THE INVENTION

The hybrid fiber/coax access network NET serves to transmit analog and digital television signals as well as data signals, for example, from a subcenter HUB to a plurality of terminals NT1, NT2, and analog and digital voice signals as well as data signals, for example, from the terminals NT1, NT2 to the subcenter HUB. The signals to be transmitted are converted from electrical to optical form, E/O1, at the subcenter HUB, and transmitted in the forward channel over a distribution network consisting of optical cables, e.g., glass fiber cables FIBRE, and optical splitters to a plurality of optical network termination units ONU, of which one is shown. In each optical network termination unit ONU, the received signals are converted from optical to electrical form. Then they are electrically transmitted over coaxial cables KOAX1, KOAX2 to the plurality of terminals NT1, NT2, of which two are shown by way of example. The video signals are, for example, movies, educational programs, or the like, which are selected by subscribers in an interactive mode. The selection of the video signals and the transmission of the data signals, e.g. for Internet access, take place via a return signal which occupies a frequency band between, for example, 5 MHz and 30 MHz.

Groups of terminals NT1; NT2 each have access to the frequency range of the return channel via an electric line associated with the respective group, a coaxial cable KOAX1; KOAX2. The access method used is TDMA (time division multiple access), FDMA (frequency division multiple access), or CDMA (code division multiple access), for example. In all these methods, one electric line is shared by a number of subscribers. Subcarrier modulation is used, so that the signal received at the optical network termination unit ONU is a quasi-analog signal.

Each optical network termination unit ONU has an analog-to-digital converter A/D1, whose input is connected to an electric line, the coaxial cable KOAX1. The quasi-analog signal received over the coaxial cable KOAX1 from the group of terminals NT1 is digitized in the analog-to-digital converter A/D1. The digitization takes place at 80 MHz and with a resolution of 10 bits, for example. Each analog-to-digital converter A/D1 may be preceded by a bandpass filter or a low-pass filter, for example to form frequency subbands or suppress interference, respectively. The digitization is carried out without previous demodulation and without frequency conversion. The received quasi-analog signal is thus fed to the analog-to-digital converter A/D1 unchanged, except that it may have been filtered.

One advantage of the digitization is that by means of digital line equipment containing a digital electrical-to-optical transducer, the digitized quasi-analog signal can be retransmitted, which eliminates the need for the complicated subcarrier signal transmission over optical fibers required with the FDMA method. To transmit the digitized signal, all conventional digital transport methods can be used regardless of the type of modulation employed. Furthermore, processing of the digitized signal at the subcenter HUB by means of a digital signal processor is simpler and lower in cost, since it can be digital, in contrast to analog processing in the case of FDMA.

A disadvantage of the digitization is that in comparison with the transmission over the coaxial cable KOAX1, a wider transmission bandwidth is necessary, which, however, is available on the optical cable FIBRE. The necessary signal-to-noise ratio, however, is substantially reduced because of the digitization. Thus, the transmission of the digitized signal improves the utilization of the capacity of the optical cable FIBRE.

Each optical network termination unit ONU includes a digital electrical-to-optical transducer E/O2 for converting the digitized signal to an optical signal. The electrical-to-optical transducer E/O2 is a directly modulated laser diode, for example. The optical signal is transmitted over the optical cable FIBRE to the subcenter HUB. The optical network termination units use wavelength-division multiplexing with different wavelengths. One optical network termination unit has a laser diode which emits light with a wavelength of 1520 nm, for example, and another has a laser diode which emits light with a wavelength of 1550 nm. The subcenter HUB contains an optical-to-electrical transducer O/E1 for converting the received optical signal back to an electric signal and a digital signal processor DSP for demodulating the electric signal and, for example, for converting the protocol into that of an integrated services digital network. Conventional, analog demodulation after digital-to-analog conversion is also possible.

Each optical network termination unit ONU may further include a second analog-to-digital converter A/D2 and a multiplexer MUX. The analog-to-digital converter A/D2 is connected to a line separated from the electric line KOAX1, namely to the coaxial cable KOAX2. The coaxial cable KOAX2 is connected to a group of terminals NT2 which all have access to the coaxial cable KOAX2. The access method used is TDMA, FDMA, or CDMA, for example.

The analog-to-digital converter A/D2 digitizes the quasi-analog signal received from the terminals NT2 and passes the digitized signal on to the multiplexer MUX. In the multiplexer, the digitized signal from the analog-to-digital converter A/D1 is multiplexed with the digitized signal from the analog-to-digital converter A/D2. The multiplexer MUX combines the two digitized signals into, for example, a signal of double bit rate or operates as a time-division multiplexer, for example. The output of the multiplexer MUX is fed to the digital electrical-to-optical transducer E/O2, where it is converted to an optical signal which is optically transmitted to the subcenter HUB.

The optical network termination unit ONU may also contain three or more analog-to-digital converters. The number of analog-to-digital converters is limited by the ratio of the transmission capacity on the optical cable FIBRE to the sum of the transmission capacities on the electric lines and by the resolution of the analog-to-digital converters. The maximum is reached when the sum of the transmission capacities of the digitized signals is equal to the transmission capacity on the optical cable FIBRE. The transmission capacity available on the optical cable FIBRE can thus be optimally utilized.

In the embodiment, each separate electric line is connected to a respective analog-to-digital converter. Alternatively, two or more electric lines may be connected to only one analog-to-digital converter, or one line may be connected to two or more analog-to-digital converters. The choice of the assignment of electric lines to analog-to-digital converters is dependent on the capacity of the analog-to-digital converters. If an analog-to-digital converter is designed for a bandwidth which is smaller than the frequency range of the return channel, it is appropriate to divide the return channel, for example by means of bandpass filters with different passbands, into separate frequency ranges and to assign a respective analog-to-digital converter to each frequency range. Furthermore, equal frequency ranges of different electric lines could be assigned to one analog-to-digital converter.

What is claimed is:

1. A method of transmitting communication signals from two or more terminals (NT1, NT2) of a hybrid fiber/coax access network (NET) over an electric line and an optical line through an optical network termination unit (ONU) having a forward channel and a return channel to provide a direct link between the optical line and the electric line, wherein the forward channel is used to convey signals from the optical line to the two or more terminals by means of an optical-to-electrical transducer (O/E2), said method comprising the steps of:

transmitting the communication signals of the two or more terminals in an electric form over the electric line to the optical network termination unit;

digitizing the electric signals received in the optical network termination unit into digital signals;

converting the digital signals to optical signals by means of a digital electrical-to-optical transducer (E2/0) in order to convey the communication signals to the electric line through the return channel.

2. The method of claim 1, wherein the electrical signals are digitized at a first bit rate, said method further comprising the step of combining the digitized signals into further digital signals of a second bit rate, which is greater than the first bit rate, prior to the electrical-to-optical conversion step.

3. The method of claim 1, wherein the electrical-to-optical transducer (O/E2) is a directly modulated laser diode.

4. The method of claim 5, wherein the laser diode emits light at a first wavelength, said method further comprising the steps of:

transmitting the communication signals of two or more further terminals together over the electric line to another optical network termination unit (ONU) in the electric form;

digitizing the electric signals received in the other optical network termination unit into other digital signals; and converting the other digitized signals to other optical signals by means of another electrical-to-optical transducer (E2/O) at a second wavelength different from the first wavelength.

5. The method of claim 1, wherein the electric signals transmitted over the electric line are quasi-analog signals.

6. The method of claim 5, wherein the quasi-analog signals are generated by subcarrier modulation in order to allow a plurality of subscribers to share the electric line.

7. A hybrid fiber/coax access network (NET) having a center (HUB) operatively connected to a plurality of terminals (NT1, NT2) through an optical network terminal unit (ONU) having a forward channel to allow communications from the center to said plurality of terminals and a return channel to allow communications from said plurality of terminals to the center, said access network (NET) comprising:

two or more electric lines (KOAX1, KOAX2) for transmitting electric signals between the optical network terminal unit (ONU) and said plurality of terminals (NT1, NT2);

at least one optical line (FIBRE) for transmitting optical signals between the optical network terminal unit (ONU) and the center (HUB), wherein the optical network unit (ONU) comprises:

two or more analog-to-digital converters (A/D1, A/D2) directly linked to the return channel to digitize electric signals received from said plurality of terminals; and an electrical-to-optical transducer (E/O2) to convert the digitized electric signals into optical signals in order to allow communication from said plurality of terminals to the center via the optical line through the return channel.

8. The access network of claim 7, further comprising a multiplexing device operatively connected between the two or more analog-to-digital converters and the electrical-to-optical transducer (E/O2) for combining the digitized signals into combined digitized electric signals.

9. The access network of claim 8, wherein the analog-to-digital converters convert the electric signals into digitized electric signals of a first bit rate, and the combined digitized electric signals have a second bit rate greater than the first bit rate.

10. The access network of claim 8, wherein the digitized electric signals are combined into the combined digitized electric signal in a time-division multiplex fashion.

11. The access network of claim 7, wherein the optical network unit (ONU) further comprises an optical-to-electrical transducer (O/E2) in the forward channel to convert optical signals received from the center (HUB) into electric signals and to transmit the converted electric signals to said plurality of terminals (NT1, NT2) over the electric lines.

12. The access network of claim 7, wherein one or more of said plurality of terminals (NT2) are connected to one of the electric lines (KOAX2) for having access thereto, wherein the access method is TDMA, FDMA or CDMA.

13. The access network of claim 7, wherein subcarrier modulation is used so that the electric signals received at the optical network termination unit (ONU) from said plurality of terminals is a quasi-analog signal.

14. The access network of claim 7, wherein each of the electric lines (KOAX1, KOAX2) is operating in a different frequency range of the return channel.

15. The access network of claim 7, wherein each of the analog-to-digital converters (A/D1, A/D2) is preceded by a bandpass filter or a low-pass filter to form frequency sub-bands and suppress interference.

16. The access network of claim 7, wherein the electrical-to-optical transducer (E/O2) is a directly modulated laser diode.

17. The access network of claim 16, wherein the laser diode emits light at a first wavelength, and wherein said access network further comprises another optical network termination unit (ONU) connected between the center and two or more further terminals, wherein the other optical network termination unit (ONU) has means to digitize electric signals received from the further terminals using another directly modulated laser diode which emits light at a second wavelength different from the first wavelength.

18. A return channel transmitter for a hybrid fibre/coax access network (NET) having a center (HUB) operatively connected to a plurality of terminals (NT1, NT2) through at least one optical network termination unit (ONU) and at least one coaxial cable (KOAX1, KOAX2) having a forward channel to allow communications from the center to said plurality of terminals and a return channel to allow communications from said plurality of terminals to the center, said return channel transmitter comprising:

a multiplexer (MUX) having at least two inputs and one output, the output being connected to an electric input of an electrical-to-optical transducer (E/O2), each input of the multiplexer (MUX) being directly connected to a digital output of an analog-to-digital converter (A/D1; A/D2), each analog-to-digital converter (A/D1; A/D2) being connected with its analog input to a bandpass filter and, wherein said return channel transmitter serves to receive quasi-analog electric signals and to optically retransmit said quasi-analog electric signals in digital form in the return channel, wherein each bandpass filter is connected to one coaxial cable (KOAX1, KOAX2) to which at least two terminals (NT) of different subscribers are connected to and serve for filtering received quasi-analog signals of different subscribers and conveying the filtered quasi-analog signals to a respective analog-to-digital converter (A/D1, A/D2), wherein each analog-to-digital converter (A/D1, A/D2) serves for directly converting the received filtered quasi-analog signals of different subscribers into digitized quasi-analog signals and conveying the digital signals directly to the multiplexer (MUX), wherein the multiplexer (MUX) serves for multiplexing the received digital signals and conveying the multiplexed digital signals to the electrical-to-optical transducer (E/O2), and wherein the electrical-to-optical transducer (E/O2) serves for converting the received multiplexed signals into optical signals and optically transmitting the optical signals in the return channel of the hybrid fibre/coax access network (NET).

19. The return channel transmitter of claim 18, characterized in that low pass filters are used instead of bandpass filters.

* * * * *

UNITED STATES PATENT AND TRADEMARK OFFICE
CERTIFICATE OF CORRECTION

PATENT NO.    : 6,281,996 B1
DATED         : August 28, 2001
INVENTOR(S)   : Krimmel It is certified that error appears in the above-identified patent and that said Letters Patent is hereby corrected as shown below:

Column 4,
Line 42, "claim 5" should be -- claim 3 --.

Signed and Sealed this

Twenty-sixth Day of March, 2002

Attest:

JAMES E. ROGAN
*Attesting Officer*        *Director of the United States Patent and Trademark Office*